United States Patent

Wagoner

Patent Number: 5,236,064
Date of Patent: Aug. 17, 1993

[54] LUBRICANT CHARGING DEVICE

[76] Inventor: Johnny M. Wagoner, 15250 Shortcut Rd., Gold Hill, N.C. 28071

[21] Appl. No.: 882,068

[22] Filed: May 12, 1992

Related U.S. Application Data

[63] Continuation-in-part of Ser. No. 763,419, Sep. 20, 1991.

[51] Int. Cl.⁵ .............................................. F01M 9/00
[52] U.S. Cl. ..................... 184/6.3; 184/6.24; 123/196 A; 123/196 S; 210/136; 210/DIG. 17
[58] Field of Search ............... 210/136, 133, DIG. 17, 210/232; 184/1.5, 6.3, 6.4, 6.24, 105.1, 105.3; 123/196 S, 196 A, 196 R

[56] References Cited

U.S. PATENT DOCUMENTS

| | | | |
|---|---|---|---|
| 2,897,966 | 8/1959 | Humbert, Jr. | 184/6.24 |
| 3,295,507 | 1/1967 | Carter et al. | 123/196 A |
| 3,322,281 | 5/1967 | Gulick | 210/136 |
| 3,774,764 | 11/1973 | Baldwin | 210/136 |
| 4,168,693 | 9/1979 | Harrison | 123/196 S |
| 4,372,848 | 2/1983 | Manders | 210/133 |
| 4,433,656 | 2/1984 | Norwood, Sr. | 123/196 A |
| 4,700,670 | 10/1987 | Schade | 123/196 S |
| 4,703,727 | 11/1987 | Cannon | 123/196 S |
| 4,854,277 | 9/1989 | Kenny | 123/196 A |
| 4,875,551 | 10/1989 | Lulich | 184/6.3 |
| 4,909,205 | 3/1990 | Bewley, III | 123/196 S |
| 4,997,554 | 3/1991 | Frostick | 210/136 |
| 5,018,491 | 5/1991 | Fish | 123/196 S |

Primary Examiner—Ira S. Lazarus
Assistant Examiner—Alan B. Cariaso
Attorney, Agent, or Firm—Bell, Seltzer, Park & Gibson

[57] ABSTRACT

A lubricant charging device for use with internal combustion engines. The device includes an adaptor for being interposed between a filter mounting plate on an engine and a spin-on type oil filter. The adaptor has first and second faces for matably engaging the filter mounting plate and oil filter, respectively. An auxiliary pump is provided, along with tubing for communicating lubricant between the sump of the engine, to the auxiliary pump, and from the auxiliary pump to the adaptor. The pump may be electrically driven so that it may be energized before the engine is started. Thus, a quantity of pressurized oil may be introduced into the working areas of the engine before starting the engine. A backflow plate and a check valve are provided to restrict the lubricant flow during prestart lubricant charging and during engine operation to ensure that the lubricant flows through the oil filter before its introduction to the working parts of the engine.

12 Claims, 2 Drawing Sheets

LUBRICANT CHARGING DEVICE

This application is a continuation-in-part application of patent application Ser. No. 07/763,419, filed Sep. 20, 1991.

FIELD OF THE INVENTION

The present invention relates to lubricant charging devices for use in conjunction with internal combustion engines. In particular, the invention relates to a lubricant charging device for introducing a supply of lubricant to moving parts of an internal combustion engine before the engine is started.

BACKGROUND OF THE INVENTION

Most internal combustion engines of the sort used on motor vehicles such as automobiles, trucks and the like contain internal lubrication systems. A sump is commonly provided in the lower regions of the engine block for retaining a quantity of oil or other lubricant, and a pump is provided for moving the oil or other lubricant from the sump to the moving parts of the engine such as cam shafts and bearings for which continuous lubrication is essential to prevent premature wear and to ensure efficient engine operation. The oil pump is generally located internally within the engine block and is often driven by a shaft, gears or chain drive or the like for which the motive power is generated by the engine crankshaft.

This arrangement has proved convenient and reliable, and it is commonly used because the entire lubrication system may be self-contained within the engine block. However, since the internal lubricant pump is mechanically driven by the engine, it is generally unsuited for charging the operative engine parts with lubricant prior to and at the time of start-up of the engine. As a result, there is usually a delay period between starting the engine and introduction of the lubricant to the operating engine parts. This delay results from the transit time of the lubricant from the sump, through the oil pump, oil filter and circulating ducts or galleys, and finally to the cam shafts, bearings and other operative parts, many of which generally lie in upper regions of the engine block.

Because this brief delay period may cause excessive engine wear, it has been found desirable to communicate the lubricant to the working surfaces before starting the engine to ensure smooth and efficient operation. Since the internal engine pump cannot readily be operated without the engine first being started, it has been found desirable to provide an auxiliary pumping system for introducing lubricant from the engine sump to the working portions of the engine. As a result, an auxiliary unit may be provided for receiving oil from the engine sump or another source, pumping the oil via an auxiliary pump that is not driven by the engine, and further communicating the oil from the external pump to the working engine parts.

A prior attempt to solve these problems is shown in U.S. Pat. No. 4,703,727, issued to Cannon on Nov. 3, 1987. This patent shows an engine oil precharging device having an adaptor which may be interposed between a canister-type oil filter and an engine block for receiving oil from an external oil reservoir and introducing it to the working engine parts before start up of the engine. However, the apparatus shown in the Cannon '727 patent is not believed to have satisfactorily solved the problems associated with engine prestart lubrication, in part because it requires an external reservoir, which is relatively bulky and which adds expense and complexity to the auxiliary apparatus. The device shown in the Cannon '727 patent also introduces oil into the engine without first directing the oil through the oil filters.

U.S. Pat. No. 4,875,551 to Lulich shows yet another lubricating device, as do U.S. Pat. Nos. 4,168,693 to Harrison, 5,018,491 to Fish, and 3,295,507 to Carter et al. However, none of these devices is believed to have proved entirely satisfactory.

In view of the foregoing, it is an object of the invention to provide a device for introducing a lubricant to the working surfaces of an internal combustion engine prior to engine start up.

A further object of the invention is to provide an auxiliary lubricant charging device that may be added to an existing internal combustion engine having an internal lubricant circulating system.

Yet another object of the present invention is to provide a lubricant charging device that is relatively simple to attach to a preexisting internal combustion engine in a motor vehicle.

A still further object of the invention is to provide a lubricant charging device that is relatively inexpensive which may be added to a preexisting internal combustion engine in a motor vehicle without substantial alteration of the vehicle or engine.

Another object of the invention is to provide an inexpensive auxiliary lubricant charging device that may be adapted to an existing engine for directing filtered lubricant to the working parts of the engine before the engine is started and which prevents backflow circulation of the lubricant through the tubing and auxiliary pump when the engine is in operation.

SUMMARY OF THE INVENTION

The above and further objects and advantages of the present invention are achieved in the embodiment described herein by the provision of a lubricant charging device having an adaptor for being interposed between a filter mounting plate, an external, auxiliary lubricant pump, and tubing for communicating lubricant from the engine sump, to the pump, through the adaptor and oil filter and to the working parts of the engine. The adaptor has first and second faces so that the adaptor may be interposed between a filter mounting plate on an engine block and a spin-on type oil filter. The first face, which may be used for matably engaging the filter mounting plate, has a centrally located, threaded receptacle for engaging a threaded mounting connector extending from the filter mounting plate. A circular gasket is circumferentially positioned around the periphery of the first face for forming a seal with the periphery of the mounting plate when the receptacle is threaded onto the male mounting connector.

The second face of the adaptor has a centrally located, threaded mounting connector extending therefrom for engaging a spin-on type oil filter. A circumferential gasket sealing surface is provided around the periphery of the second face.

An axial passage extends through the central portion of the adaptor for communicating a lubricant between the female receptacle on the first face and the male mounting connector on the second face. A plurality of outlet passages are further formed within the adaptor around the periphery of the axial passage but within the gasket of the first face and sealing surface of the second face for communicating lubricant between the first and second faces.

A backflow plate is provided adjacent the first face. The backflow plate has a plurality of openings such that each opening is associated with a respective peripheral outlet passage. A flexible panel is provided at each opening in the backflow plate for restricting lubricant flow from passing out of the peripherally arranged outlet passages in a direction away from the first face.

The external, auxiliary lubricant pump may be operated by an electrical motor which may also be compactly mounted therewith. The auxiliary pump includes an inlet in communication with the engine sump and an outlet in communication with the adaptor via tubing. The tubing that extends from the pump outlet is connected to a priming port in the adaptor which communicates with at least one of the peripheral outlet passages in the adaptor. A check valve is also provided at the priming port to prevent backflow of lubricant into the pump outlet, particularly when the auxiliary pump is deenergized and the engine has been started such that the internal lubrication system of the engine is developing sufficient oil pressure. A switch for energizing the pump prior to starting the engine is also provided.

BRIEF DESCRIPTION OF THE DRAWINGS

The foregoing and other objects, advantages and features of the invention, and the manner in which the same are accomplished, will become more readily apparent upon consideration of the following detailed description of the invention taken in conjunction with the accompanying drawings which illustrate a preferred and exemplary embodiment, and wherein.

DESCRIPTION OF THE PREFERRED EMBODIMENT

Figure 1:
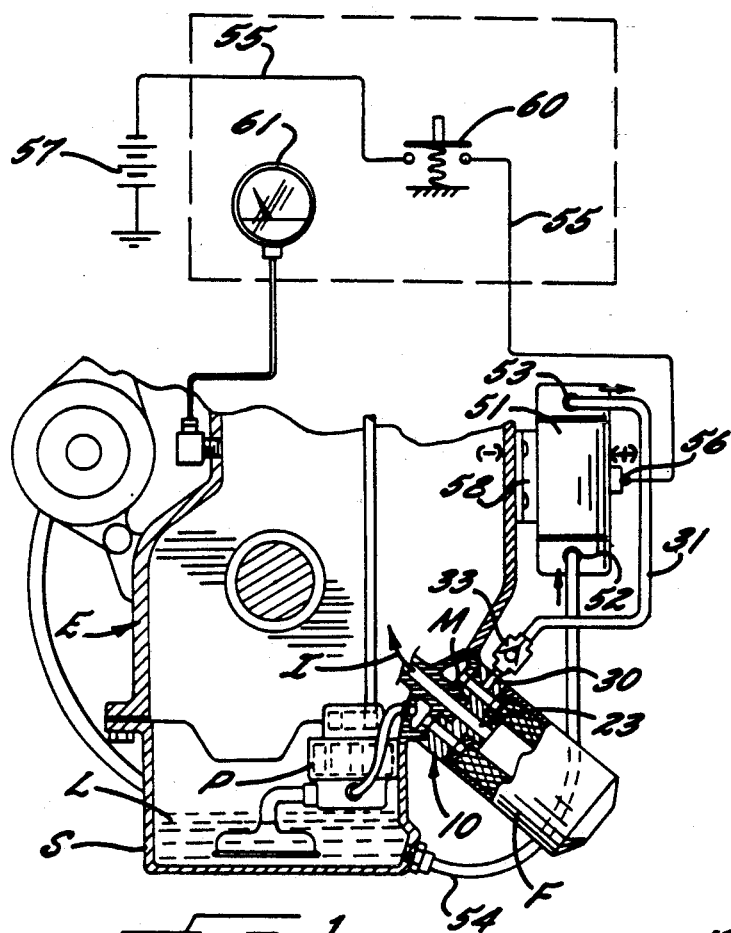
FIG. 1 is a partially schematic, sectional environmental view illustrating a preferred embodiment of a lubricant charging device made in accordance with the present invention.

Referring now to the drawings, FIG. 1 shows a lubricant charging device made in accordance with the present invention, attached to a typical gasoline or diesel engine block shown as E. The engine block E includes an internal lubricant pump P having an intake for receiving a lubricant L, such as oil or the like, of which a quantity is maintained within the sump S or lower regions of the engine E.

Still referring to FIG. 1, an adaptor 10 is shown interposed between a filter mounting plate M on the engine block E and a spin-on type oil filter F. The adaptor 10 may be used to divert a quantity of oil L that has been removed from the sump S into the lubrication system of the engine E for precharging the working areas of the engine E with lubricant to prevent increased engine wear prior to and at the time that the engine is started and for a time shortly thereafter.

Figure 2:
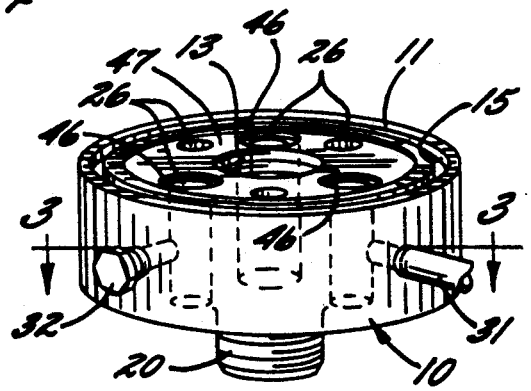
FIG. 2 is a perspective view of an adaptor made in accordance with the present invention.

As shown in FIG. 2, the adaptor 10 has a first face 11 for matably engaging the filter mounting plate M of the engine E. A second face 12 is provided on the side of the adaptor 10 opposite the first face 11 for matably engaging a spin-on type oil filter F. The first face 11 includes a centrally located, threaded female receptacle 13 for engaging a threaded mounting connector extending from the mounting plate M of the engine E.

A groove 15 is provided near the periphery of the first face 11. In a preferred embodiment, the groove 15 is of suitable depth and width for accommodating a circular gasket 16, shown in cross-section FIG. 4. Thus, the circular gasket 16 is circumferentially positioned around the periphery of the first face 11.

Figure 4:
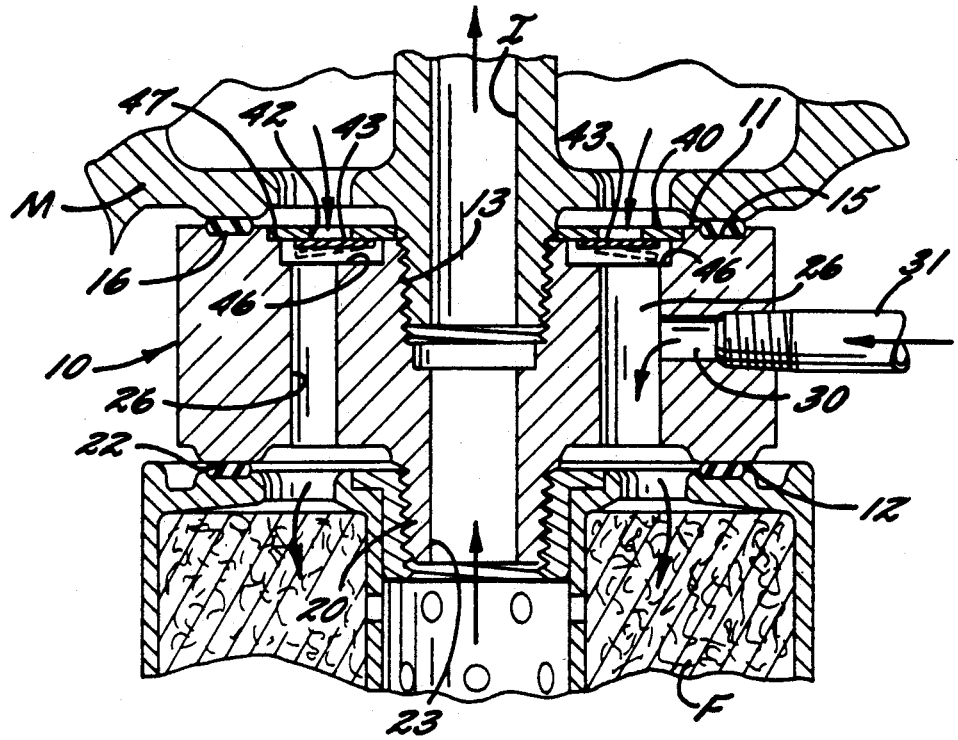
FIG. 4 is a sectional environmental view of a preferred embodiment of an adaptor made in accordance with the present invention.

Referring now to FIG. 4, the adaptor 10 may be mounted on the filter mounting plate M of the engine block E by threading the receptacle 13 onto the mounting connector of the mounting plate M. Thus, the adaptor 10 may be urged into secure engagement with the mounting plate M by rotating the adaptor 10 until the first face 11 moves into close proximity with the mounting plate M. The gasket 16 may thus be urged into contact with a sealing surface of the mounting plate M to create a lubricant-impervious seal.

The second face 12 of the adaptor 10 is similar to the mounting plate M of the engine block E so that a spin-on type filter F may be mounted thereon. As shown in FIG. 4, the second face 12 has a centrally located, threaded male mounting connector 20 extending therefrom and a circumferential gasket sealing surface 22 located outwardly thereof. Thus, the filter F may be mounted on the adaptor 10 by threading the mounting connector 20 into the filter F such that a gasket on the filter F securely contacts the sealing surface 22 on the second face 12.

Figure 3:
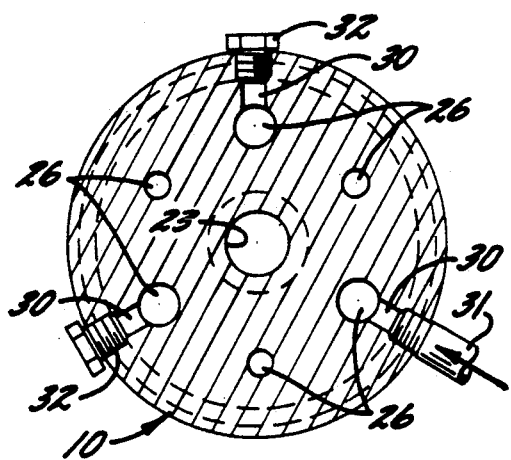
FIG. 3 is a sectional view taken along line 3—3 of FIG. 2.
Figure 5:
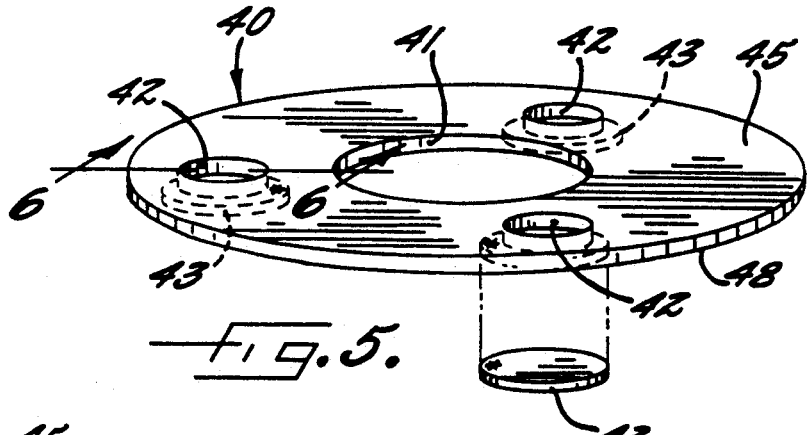
FIG. 5 is a perspective view of a preferred embodiment of the backflow plate of the present invention.

As shown in FIGS. 3, 4 and 5, the adaptor 10 includes an axial passage 23 that extends between the receptacle 13 on the first face 11 and the mounting connector 20 on the second face 12. The axial passage 23 is adapted to communicate a lubricant or other fluid between the receptacle 13 and mounting connector 20, respectively. Likewise, at least one outlet passage 26 extends between the first face 11 and the second face 12 for communicating a lubricant or other fluid between the faces 11 and 12. Preferably, a plurality of outlet passages 26 are arranged peripherally within the adaptor 10 around the axial passage 23 but within the gasket 16 and sealing surface 22.

In the embodiment shown in FIG. 3, six outlet passages 26 are spaced essentially uniformly around the periphery of the axial passage 23. A greater or smaller number of passages 23 may be used, as necessary. The outlet passages 26 may also be of varying sizes. In the illustrated embodiment, three large and three small passages 26 are arranged alternately around the periphery of the axial passage 23.

FIG. 3 shows that the adaptor 10 includes at least one priming port 30 which leads into at least one of the outlet passages 26. In the embodiment shown at FIG. 3, three priming ports 30 lead into three of the relatively larger outlet passages 26. The priming ports 30 may be threaded or otherwise suited for receiving an end of a length of tubing 31. Alternatively, the threaded priming ports 30 may be closed by plugs 32. Thus, the priming ports 30 may be used to communicate a lubricant between at least one of the outlet passages 26 and an outside source.

Figure 6:
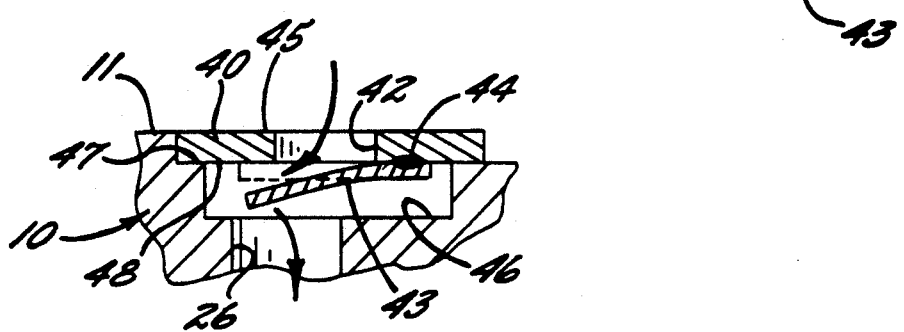
FIG. 6 is a sectional environmental view taken along line 6—6 of FIG. 5.

FIGS. 4, 5 and 6 illustrate a backflow plate 40. As best seen in FIG. 5, the backflow plate 40 is generally circular in shape and has a large central perforation 41 for being fitted around the receptacle 13 on the first face 11. The plate 40 may be made of sheet metal such as steel or aluminum, although other materials may be substituted. The plate 40 may be about one-sixteenth inch thick. Heavier or lighter stock may be used if needed.

At least one opening 42 is formed outside the central perforation 41. In the preferred embodiment, a plurality of openings 42 is provided, such that each opening 42 may be aligned with at least one of the outlet passages 26 in the first face 11. In the embodiment shown in FIG. 5, three openings 42 are positioned uniformly around the plate 40 so as to align with the relatively larger outlet passages 26 which may be seen in FIGS. 2 and 3. A greater or lesser number of openings 42 may be provided around the plate 40 as needed to permit communication of lubricant through the outlet passages 26. The openings 42 may have a diameter of about one quarter inch, although they may be larger or smaller depending on the particular application and the necessary lubricant flow rate.

As shown in FIG. 4, the plate 40 may be received adjacent the first face 11 of the adaptor 10. A recessed area 47 sufficient to accommodate the thickness of the plate 40 may be formed in the first face 11. In a preferred embodiment, the area 47 is recessed about one-sixteenth inch below the part 17 of the face 11.

Referring now to FIGS. 5 and 6, the plate 40 includes means 43 for restricting lubricant flow out of the outlet passages 26 on the first face 11. In a preferred embodiment, the means 43 is a flexible panel affixed to the plate 40 near a side of each opening 42. The panels 43 are affixed to the plate 40 by a spot weld or other weld 44 near an edge of each associated opening 42. Rivets, adhesive or other suitable fasteners or means may be used to affix the panels 43 to the plate 40 in lieu of the weld 44 or in addition thereto. The flexible panels 43 may be made of sheet metal such as aluminum or steel about one-sixteenth inch thick. Other materials may be used, and heavier or lighter stock may be used depending on the size of the openings 42, the desired lubricant pressures, and the desired lubricant flow rates.

As shown in FIG. 6, the backflow plate 40 and flexible panels 43 thereon restrict lubricant flow to one direction only. A relatively higher pressure of lubricant on the side 45 of the backflow plate 40 causes the panels 43 to flex away from the plate 40. Thus, a quantity of lubricant L may pass through the openings 42 and further into the outlet passages 26. However, when the lubricant on the side 48 of the plate 40 is at a pressure that is relatively higher than the pressure of the lubricant on the side 45 of the plate 40, the panels 43 are biased against the plate 40, thereby covering the openings 42 and obstructing any lubricant from flowing from the passages 26, through the opening 42, and into the engine E.

As shown in FIG. 6, the first face 11 may further include a depressed region 46 around the edges of the outlet passages 26 to accommodate the flexible panels 43. The depressed region 46 may be about one-quarter inch deep, although this dimension may vary according to the circumstances.

Referring now to FIG. 1, the charging device includes the adaptor 10 as described hereinabove, an auxiliary pump 51 having an inlet 52 and an outlet 53. The auxiliary lubricant pump 51 may be mounted externally to the engine E by bracket 58 or other means. Preferably, the auxiliary pump 51 is mounted within the engine compartment of a motor vehicle.

One end of a length of tubing 54 is connected too the sump S of the engine E so as to draw oil or other lubricant from the sump S. The other end of the tubing 54 is attached to the inlet 52 of the pump 51 so as to communicate a lubricant from the sump S of the engine E to the inlet 52. A second length of tubing 31 is connected to the outlet 53 of the pump 51 and the priming port 30 of the adaptor 10. Thus, the tubing 31 communicates the lubricant between the outlet 53 and the priming port 30.

A check valve 33 is provided between the priming port 30 and the outlet 53 to prevent lubricant from flowing from the priming port 30 into the outlet 53. In a preferred embodiment, the check valve 33 is adjacent the port 30 so that the tubing 31 and auxiliary pump 51 are not pressurized when the auxiliary pump 51 is deenergized and the internal lubrication pump P of the engine E is in operation.

In a preferred embodiment, the auxiliary pump 51 is a self contained unit which includes an electric drive motor. The drive motor is driven by the electrical supply system of the motor vehicle within which the engine E is mounted. Referring to FIG. 1, the electric motor of pump 51 may be grounded to the engine block through the pump mount 58. A conductor 55 extends between a terminal 56 on the motorized pump 51 and further to a source of power such as a battery 57.

A switch 60 is provided along the conductor 55 for selectively energizing the motorized pump 51 for precharging the engine E with lubricant. As shown schematically in FIG. 1, the switch 60 may be located within the passenger compartment of a vehicle for easy access by an operator or driver.

When a driver or other operator desires to start the engine E, the lubricant charging device may be actuated by closing the switch 60. Lubricant L is then drawn from the sump of the engine E by the pump 51 via tubing 54. After passing through the pump 51, the lubricant moves from the outlet 53 through the tubing 31, past check valve 33 and into the priming port 30 of the adaptor 10.

As seen in FIG. 4, the introduction of a relatively higher pressure lubricant into the priming port 30 biases the flexible panels 43 of the backflow plate 40 in a closed position against the openings 42. Thus, the lubricant is directed through the outlet passages 26, past the second face 12, and into the filter F. The lubricant thus passes through the filter F in a manner which is readily known and understood to those skilled in the art.

After passing through the filtration medium, the lubricant then exits the central threaded receptacle of the filter F and passes into the mounting connector 20 of the second face 12. The lubricant then passes through the axial passage 23, out of the receptacle 13 on the first face 11, and into the intake opening I of the mounting plate M. Thus, the lubricant may be directed into the internal working areas of the engine E before the engine has been started.

An oil pressure gauge 61 is provided in the vicinity of the operator or driver for monitoring the introduction of pressurized oil into the working areas of the engine E. The operator may visually monitor the pressure gauge 61 to determine when a sufficient quantity and pressure of lubricant has been supplied to the working parts of engine E to ensure adequate lubrication prior to starting the engine E. An indicator light may be substituted for the gauge 61.

In one embodiment, the switch 60 may be incorporated into the key type switch which is commonly used for starting the engine E. Alternatively, a separate switch may be provided.

The backflow plate 40 and check valve 33 ensure correct flow of lubricant through the engine lubricating system when the lubricant charging device is in operation prior to starting the engine E and also when the charging device is disengaged and the engine E is in operation. When the charging device is in operation, the flow of lubricant induced by the auxiliary pump 51 opens the check valve 33 and closes the flexible panels 43, as described hereinabove. However, after the engine E has been started and the auxiliary pump 51 has been deenergized by opening switch 60, the lubricant flow induced by the internal engine lubricant pump P biases the flexible panels 43 away from the openings 42 of the backflow plate 40 to permit lubricant to flow in the usual manner into the filter F. Likewise, the resultant, relatively higher pressure in the outlet passages 26 biases the check valve 33 into a closed position, thus preventing unwanted reverse flow of lubricant through the tubing 31, auxiliary pump 53 and tubing 54, or unwanted pressurization of these components. Thus, the lubricant flows essentially in the normal manner through the engine E when the engine is in operation.

An internal engine check valve (not shown) may be used in lieu of the backflow plate 40 and flexible panels 43 to prevent unwanted flow of lubricant into the internal lubricant pump P when the charging device is in operation. However, the backflow plate 40 with associated flexible panels 43 is preferred over an internal check valve for most applications, since use of the backflow plate 40 does not require modification of any internal components of the engine E when the charging device is attached to a preexisting engine E.

In the drawings and specification, there has been disclosed a typical preferred embodiment of the invention. Although specific terms have been employed, they have been used in a generic and descriptive sense only and not for purposes of limitation, the scope of the invention being set forth in the following claims.

What is claimed is:

1. A lubricant charging device, comprising:
   an adaptor for being interposed between a filter mounting plate on an engine and a spin-on type oil filter, said adaptor having opposite first and second faces;
   said first face having a centrally located, threaded receptacle and a peripheral gasket, whereby said first face may be installed on the filter mounting plate of the engine;
   said second face having a centrally located, threaded mounting connector extending therefrom, and a peripheral gasket sealing surface, whereby an oil filter may be installed on said second face;
   said adaptor further including an axial passage extending between said receptacle on said first face and said mounting connector on said second face for communicating a lubricant from the oil filter to the engine;
   a plurality of outlet passages extending through said adaptor between said first and second faces and arranged around said axial passage for communicating lubricant from the engine to the oil filter;
   a priming port for communicating lubricant from an outside source into at least one said outlet passage;
   a check valve for preventing lubricant flow from said at least one outlet passage through said primary port to the outside source;
   a backflow plate adjacent said first face;
   at least one opening formed in said backflow plate for permitting communication of lubricant between the engine and said outlet passages; and
   a flexible panel interposed between said first face and said at least one opening, said flexible panel having an edge affixed to said backflow plate adjacent said at least one opening and further having a portion not affixed to said backflow plate, whereby said flexible panel may be biased toward said backflow plate by differential lubricant pressures on opposite sides of said backflow plate to thereby close said at least one opening to prevent lubricant that is introduced through said priming port into said at least one outlet passage from flowing through said at least one opening into the engine and instead directing the lubricant toward said second face and into the filter, or alternatively, biased away from said backflow plate to permit lubricant to flow from the engine through said outlet passages to the filter.

2. A lubricant charging device as defined in claim 1 wherein said backflow plate includes a plurality of said openings.

3. A lubricant charging device as defined in claim 1 further comprising an auxiliary lubricant pump having an inlet and an outlet, a first length of tubing for communicating lubricant between the sump of an internal combustion engine and said pump inlet, and a second length of tubing for communicating lubricant from said pump outlet to said priming port of said adaptor, whereby said pump may draw lubricant from the engine sump to direct the lubricant into said priming port.

4. A lubricant charging device as defined in claim 3 further comprising means for mounting said auxiliary pump externally of the engine.

5. A lubricant charging device as defined in claim 3 wherein said pump is driven by an electric motor.

6. A lubricant charging device as defined in claim 5 further comprising a switch for energizing said electric motor to drive said pump before the internal combustion engine is started.

7. A lubricant charging device as defined in claim 1 wherein said flexible panel is made of sheet metal.

8. A lubricant charging device as defined in claim 7 wherein each said flexible panel is affixed to said backflow plate by a spot weld adjacent each said opening.

9. A lubricant charging device as defined in claim 1 further comprising a depressed area in said first face of said adaptor adjacent said flexible panel to permit said panel to be biased toward or away from said backflow plate.

10. A lubricant charging device as defined in claim 7 wherein said flexible panel is made of steel.

11. A lubricant charging device as defined in claim 7 wherein said flexible panel is made of aluminum.

12. A lubricant charging device as defined in claim 7 wherein said sheet metal is about one-sixteenth of an inch thick.

* * * * *